United States Patent
Oshima

(10) Patent No.: US 8,406,549 B2
(45) Date of Patent: Mar. 26, 2013

(54) IMAGE PROCESSING APPARATUS, IMAGE PROCESSING METHOD, AND IMAGE PROCESSING PROGRAM

(75) Inventor: Yuzo Oshima, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 1614 days.

(21) Appl. No.: 11/895,467

(22) Filed: Aug. 24, 2007

(65) Prior Publication Data

US 2008/0059548 A1    Mar. 6, 2008

(30) Foreign Application Priority Data

Sep. 5, 2006    (JP) ................................. 2006-240751

(51) Int. Cl.
*G06K 9/40* (2006.01)
*G06F 17/10* (2006.01)

(52) U.S. Cl. ........................................ 382/260; 708/308

(58) Field of Classification Search .................. 382/260, 382/240, 254, 261, 303, 317, 100; 358/1.15, 358/1.13, 1.16, 1.17, 3.28, 442, 448, 474, 358/540; 708/308
See application file for complete search history.

(56) References Cited

U.S. PATENT DOCUMENTS

2004/0125411 A1* 7/2004 Tonami et al. ................. 358/2.1
2006/0274969 A1* 12/2006 Nagao et al. ................. 382/276

FOREIGN PATENT DOCUMENTS

JP             3679349          5/2005

* cited by examiner

*Primary Examiner* — Yon Couso
(74) *Attorney, Agent, or Firm* — Cooper & Dunham LLP

(57) ABSTRACT

An image processing apparatus is disclosed that includes an input unit that inputs data subject to image processing, an input filter that controls data input operations of the input unit, an output unit that outputs processed data resulting from the image processing, an output filter that controls data output operations of the output unit, and at least one processing filter arranged between the input filter and the output filter that processes the input data. An interruption process or a termination process for stopping the image processing is successively performed within the output filter, the processing filter, and the input filter starting with the output filter.

6 Claims, 7 Drawing Sheets

IMAGE PROCESSING APPARATUS, IMAGE PROCESSING METHOD, AND IMAGE PROCESSING PROGRAM

BACKGROUND OF THE INVENTION

1. Field of the Invention

The present invention relates to an image processing apparatus, an image processing method, and an image processing program.

2. Description of the Related Art

It is becoming commonplace for an image processing apparatus such as a multifunction machine, which is capable of functioning as a printer, a copier, a scanner, and/or a facsimile machine, for example, to include a CPU for controlling various functions through execution of relevant applications in a manner similar to a computer.

For example, Japanese Patent No. 3679349 discloses an image processing apparatus that provides a function commonly used by plural applications as a platform, the applications being implemented using an API (application programming interface) of the platform. In the disclosed image processing apparatus, by providing a commonly used function as a platform, overlapping implementation of the same function in plural applications may be prevented and overall application development efficiency may be improved.

However, in a platform having a commonly used API, the granularity of the function or interface provided by the platform has to be adjusted to a suitable level in order to obtain improvements in the overall application development efficiency.

For example, when the granularity is too low, the API may have to be called numerous times even in the case of implementing an application for providing a relatively simple service, and the source code may be complicated.

On the other hand, when the granularity is too high, corrections may have to be made within the platform in the case of implementing an application that provide a service of a function that is partially changed, for example, and the number of development processes may be increased. It is particularly noted that when the dependency between modules within a platform is relatively strong, existing functions may have to be corrected in addition to introducing new functions to the platform to further complicate the situation.

Also, even in the case of changing only a part of a service (e.g., image input process) provided by an existing application, implementation of the existing application for the parts other than the changed part may not be possible. Therefore, a new source code has to be described to implement a new application.

SUMMARY OF THE INVENTION

An aspect of the present invention is related to simplifying customization and extension of a function of an image processing apparatus, an image processing method, and an image processing program.

According to one embodiment of the present invention, an image processing apparatus is provided that includes:

an input unit that inputs data subject to image processing;

an input filter that controls data input operations of the input unit;

an output unit that outputs processed data resulting from the image processing;

an output filter that controls data output operations of the output unit; and at least one processing filter arranged between the input filter and the output filter which processing filter processes the input data;

wherein at least one of an interruption process and a termination process for stopping the image processing is successively performed within the output filter, the processing filter, and the input filter starting with the output filter.

In one aspect of the present embodiment, customization and extension of a function of the image processing apparatus may be facilitated, and interruption processes and termination processes for stopping image processing may be performed at appropriate timings, for example.

According to a preferred embodiment, the input filter, the output filter, and the processing filter may be controlled based on a common operation definition.

In one aspect of the above embodiment, the filters may be easily controlled and generation of the filters may be facilitated, for example.

According to another preferred embodiment, the output filter, the processing filter, and the input filter may successively perform the interruption process by completing predetermined data processing upon receiving an interruption command and outputting the interruption command after completing the predetermined data processing.

In one aspect of the above embodiment, image processing may be interrupted after output operations are completed up to a predetermined data set so that interruption processes may be performed at appropriate timings without risking the safety of the image processing apparatus.

According to another preferred embodiment, the image processing apparatus may further include a control unit that controls the input filter, the output filter and the processing filter, and when the control unit issues an image processing execution command to the output filter, predetermined processes may be independently performed by the input filter, the output filter, and the processing filter.

In one aspect of the above embodiment, the corresponding predetermined processes of the filters may be performed at arbitrary timings within the filters.

According to another embodiment of the present invention, an image processing method is provided that includes:

a step of controlling input operations of an input unit that inputs data subject to image processing;

a step of controlling output operations of an output unit that outputs processed data resulting from the image processing; and a step of processing the data which step is performed between the input operations controlling step and the output operations controlling step; wherein at least one of an interruption process and a termination process for stopping the image processing is successively performed with respect to the output operations controlling step, the data processing step, and the input operations controlling step starting with the output operations controlling step.

According to another embodiment of the present invention, a computer-readable image processing program that enables a computer to execute the image processing method of the present invention is provided.

DESCRIPTION OF THE PREFERRED EMBODIMENTS

In the following, preferred embodiments of the present invention are described with reference to the accompanying drawings.

It is noted that the preferred embodiments of the present invention described below employ the so-called pipe and filter system as software architecture for simplifying customization and extension of a function, for example. Also, according to the preferred embodiments, in the case of interrupting or terminating image processing operations, interruption or termination processes are successively performed on filters from the output side to properly interrupt or terminate image processing operations.

First Embodiment

Figure 1:
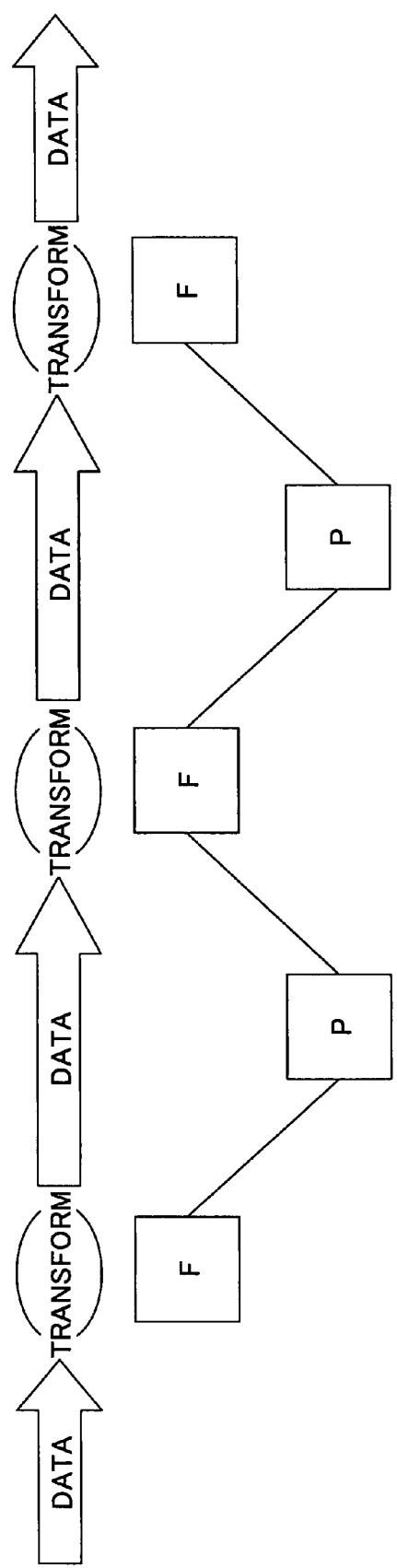
FIG. 1 is a diagram illustrating a conceptual framework of a pipe and filter system.

In the following, the pipe and filter system is described with reference to FIG. 1. FIG. 1 is a diagram illustrating a conceptual framework of the pipe and filter system. In this drawing, 'P' denotes a pipe and 'F' denotes a filter.

A filter is a program that performs a predetermined process on input data and outputs the processed data. A pipe interconnects two filters and is configured to temporarily store processed data output from the filter connected to the input side of the pipe and transmit the processed data to the filter connected to the output side of the pipe. According to the pipe and filter system, processes of filters may be successively performed via pipes.

In an embodiment of the present invention, the predetermined process performed by a filter is regarded as a data transform process performed on input data. That is, functions performed in an image processing apparatus according to an embodiment of the present invention may be perceived as a succession of transform processes performed on a document (input data). It is noted that functions of the image processing apparatus may include inputting, processing, and outputting of a document (data). Accordingly, in the following descriptions, the processes of inputting, processing, and outputting data are each regarded as transform processes, and a software component for realizing each transform process is embodied by a filter.

According to an embodiment of the present invention, an input filter that controls data input operations, a processing filter that controls data processing operations, and an output filter that controls data outputting operations correspond to independent programs so that dependency does not exist between these filters. Accordingly, the filters may be independently installed or uninstalled in an image processing apparatus.

In the following, an image processing apparatus 100 according to an embodiment of the present invention is described.

It is noted that the above-described pipe and filter system is applied to the software architecture for realizing the various functions of the image processing apparatus 100 according to the present embodiment.

Figure 2:
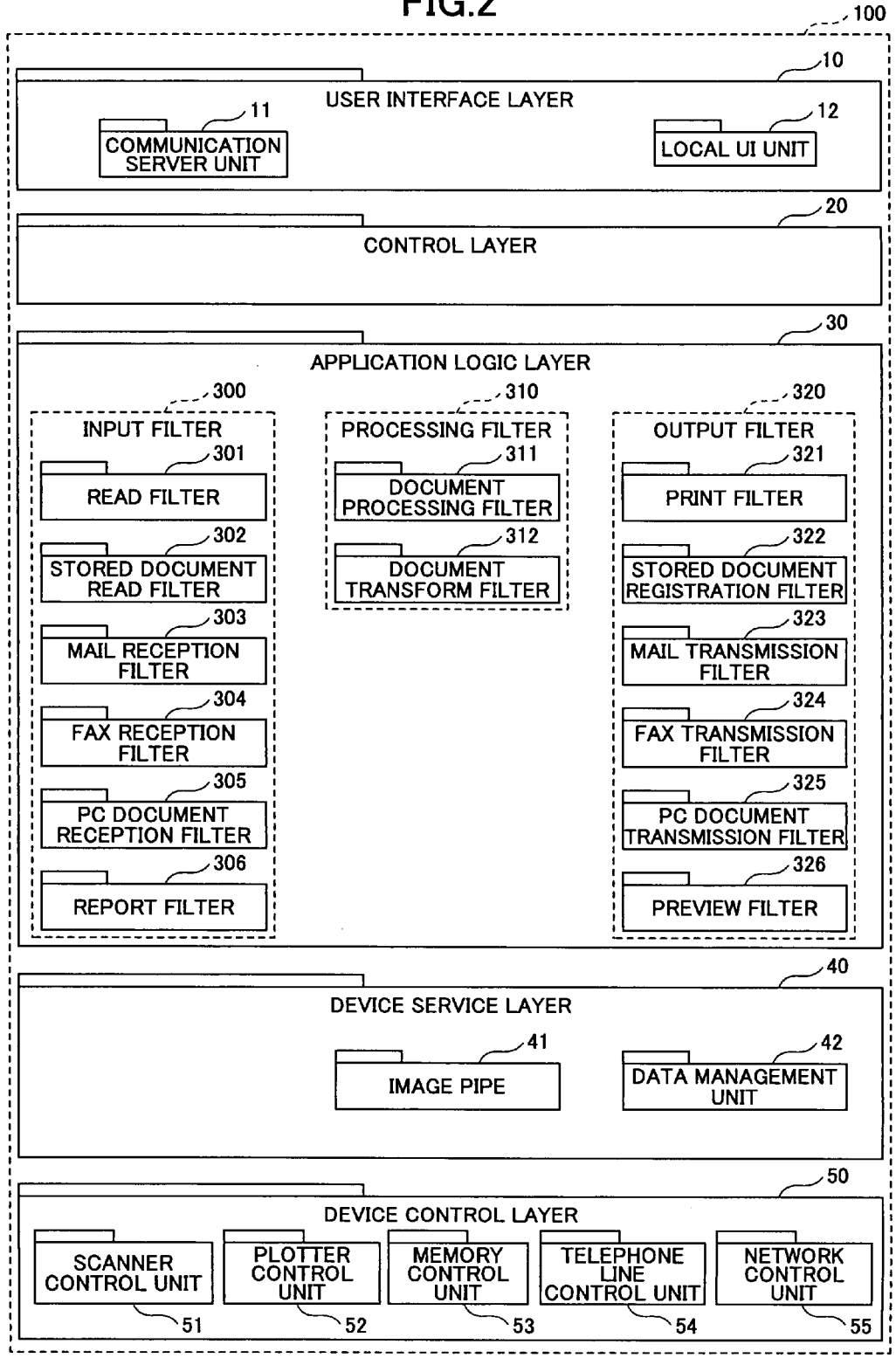
FIG. 2 is a block diagram showing a software configuration of an image processing apparatus according to an embodiment of the present invention.

FIG. 2 is a diagram showing an exemplary software configuration of the image processing apparatus according to the present embodiment. The image processing apparatus 100 may be a multifunction machine that is capable of functioning as a printer, a copier, a scanner, and/or a facsimile machine, for example.

Software for realizing the functions of the image processing apparatus 100 has a layered structure including a user interface layer 10, a control layer 20, an application logic layer 30, a device service layer 40, and a device control layer 50. The hierarchical relationship between the layers is based on the accessing relationship between the layers. That is, in FIG. 2, an upper layer is configured to call a lower layer.

In the image processing apparatus 100, when a request for executing a function (execution command) is input by a user via the user interface layer 10, the user interface layer 10 calls the control layer 20 to control the application logic layer 30 based on the execution command. The application logic layer 30 executes the application for enabling the requested function based on directions from the control layer 20. Then, the device service layer 40 and the device control layer 50 control hardware resources of the image processing apparatus 100 based on the application execution outcome. In this way, the image processing apparatus 100 may obtain an output corresponding to the requested function accepted at the user interface layer 10.

In the following, the layers are described.

The user interface layer 10 includes a communication server unit 11 and a local UI (user interface) unit 12, for example, and has the function of accepting execution commands for executing functions of the image processing apparatus 100. It is noted that functions of the image processing apparatus 100 may include a copying function, a printing function, a scanning function, and a facsimile function, for example. According to one embodiment, the communication server unit 11 may accept an execution command from a client PC (personal computer) via a network, for example. The local UI unit 12 may accept an execution command via an operations panel (not shown) of the image processing apparatus 100, for example. The execution command accepted at the user interface layer 10 is transmitted to the control layer 20.

The control layer 20 controls operations for executing the functions of the image processing apparatus 100. In one specific example, the control layer 20 may connect filters included in the application logic layer 30 according to the requested function and control execution of the requested function using the connected filters. In the following descriptions, a function of the image processing apparatus 100 refers to a unit of service that the image processing apparatus 100 provides to a user (i.e., from when a command is input until a resulting output is obtained). In terms of software, a function of the image processing apparatus 100 may correspond to an application for providing a unit of service.

The application logic layer 30 includes filters as components for realizing parts of the functions provided by the image processing apparatus 100. The application logic layer 30 is controlled by the control layer 20 to interconnect plural filters for realizing a certain function. In the example of FIG. 2, the application logic layer 30 includes an input filter 300, a processing filter 310, and an output filter 320. These filters are configured to operate based on the same definition, and are controlled by the control layer based on this definition.

The device service layer 40 includes a subordinate function that is commonly used by the filters of the application logic layer 30. Specifically, the device service layer 40 of FIG. 2 includes an image pipe 41 and a data managing unit 42. The image pipe 41 realizes functions of the pipe as described above and is configured to transmit processed data output from one filter to another filter of the application logic layer 30. It is noted that the image pipe 41 may interconnect the input filter 300 and the processing filter 310, or it may interconnect the processing filter and the output filter 320. The data managing unit 42 may be a database within the image processing apparatus 100 that stores information such as user information registered by a user, and data such as document data and/or image data processed by the image processing apparatus 100, for example.

The device control layer 50 includes drivers as programs for controlling hardware components of the image processing apparatus 100. In the example of FIG. 2, the device control layer 50 includes a scanner control unit 51, a plotter control unit 52, a memory control unit 53, a telephone line control unit 54, and a network control unit 55. These control units are configured to control corresponding devices of the image processing apparatus 100.

In the following, the filters of the application logic layer 30 are described in greater detail.

The input filter 300 according to the present embodiment controls input processes performed on data input from the external side of the image processing apparatus 100. The input filter 300 includes a read filter 301, a stored document read filter 302, a mail reception filter 303, a fax reception filter 304, a PC document reception filter 305, and a report filter 306, for example.

The read filter 301 controls image data reading operations of a scanner, for example, and outputs the read image data. The mail reception filter 303 receives electronic mail in the image processing apparatus 100 and outputs data contained in the received electronic mail. The fax reception filter controls fax receiving operations and outputs the received data. The PC document reception filter 305 receives print data from a client PC (not shown), for example, and outputs the received print data. The report filter 306 organizes data such as setting information and history information into a table chart, for example, and outputs the organized data. The stored document read filter 302 reads data stored within the image processing apparatus 100 such as data stored in the data managing unit 42 or some other storage device (not shown) of the image processing apparatus 100 and outputs the read data.

The processing filter 310 performs a predetermined process on input data from a filter at the input side of this processing filter 310 and outputs the processed data to a filter at the output side of the processing filter 310. The processing filter 310 includes a document processing filter 311 and a document transform filter 312, for example. The document processing filter 311 performs a predetermined image conversion process on input data and outputs the processed data. It is noted that the image conversion process performed by the document processing filter 311 may be an image integration process or an image scaling process, for example. The document transform filter 312 performs a rendering process on input data and outputs the processed data. Specifically, the document transform filter 312 inputs PostScript data, transforms the input data into bitmap data, and outputs the resulting bitmap data.

The output filter 320 controls output processes performed on input data and outputs the processed data to the external side of the image processing apparatus 100. The output filter 320 includes a print filter 321, a document registration filter 322, a mail transmission filter 323, a fax transmission filter 324, a PC document transmission filter 325, and a preview filter 326, for example.

The print filter 321 controls a plotter to output (print) input data. The mail transmission filter 323 attaches input data to an electronic mail and transmits the electronic mail. The fax transmission filter 324 transmits input data through facsimile transmission. The PC document transmission filter 325 transmits input data to a client PC (not shown), for example. The preview filter 326 controls an operations panel (not shown) of the image processing apparatus 100 to display input data for preview. It is noted that data output from the document registration filter 322 are internally stored within the image processing apparatus 100 by being output to the data managing unit 42 or some other storage device of the image processing apparatus 100.

According to the present embodiment, functions of the image processing apparatus 100 may be realized by connecting the filters of the application logic layer 30. That is, the image processing apparatus 100 may realize various functions depending on the connection of filters and pipes. For example, in the case of realizing a copying function, the read filter 301, the document processing filter 311, and the print filter 321 may be interconnected.

In the following, operations of the image processing apparatus 100 are described.

Figure 3:
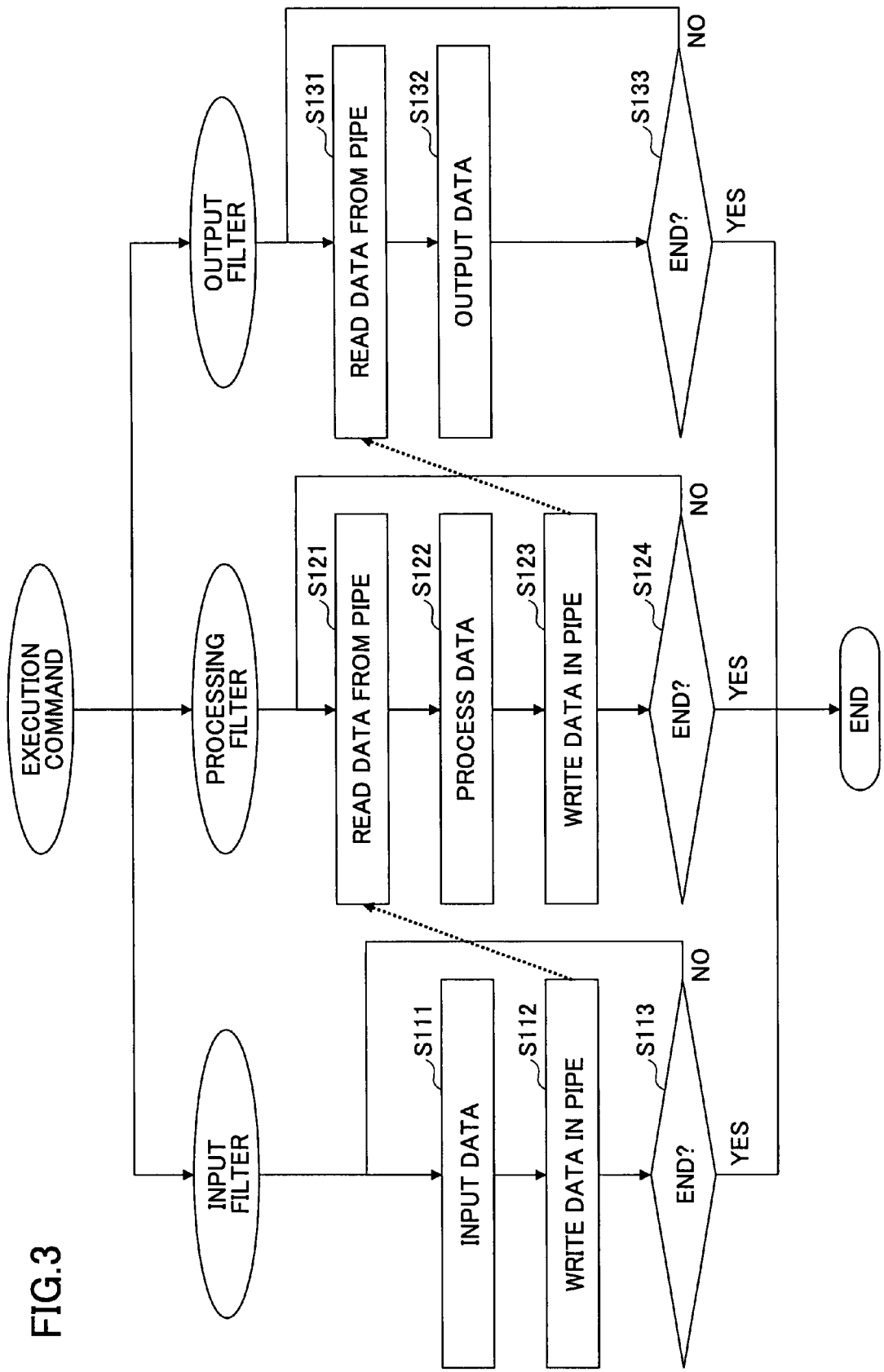
FIG. 3 is a flowchart illustrating operations for executing a function of the image processing apparatus shown in FIG. 2.

FIG. 3 is a flowchart illustrating operations of the image processing apparatus 100 for executing a process of a given function.

According to FIG. 3, the input filter inputs data using an input device (step S111) and outputs the input data to a pipe connected to the output side of this input filter (step S112). In a case where the input data are divided into plural sets of data to be input through plural input processes (e.g., when plural document pages are scanned), the process steps of inputting data to the input filter and outputting the input data to the pipe are repeated. When the above process steps are completed on all data subject to the input processes of the input filter (step S113, YES), operations of the input filter are ended.

The processing filter starts its operations upon detecting data input to a pipe connected to its input side. First, the processing filter reads data from the corresponding pipe (step S121) and performs data processing on the read data (step S122). Then, the processing filter outputs the processed data to a pipe connected to its output side (step S123). When the above process steps are performed on all data input to the pipe at the input side of the processing filter (step S124, YES), operations of the processing filter are ended.

The output filter starts its operations upon detecting data input to a pipe connected to the input side of this output filter. First, the output filter reads data from the pipe (step S131) and then outputs the read data using an output device (step S132). When the above process steps are completed with respect to all data input to the pipe connected to the input side of the output filter (step S133, YES), operations of the output filter are ended.

As can be appreciated, in the image processing apparatus 100 according to an embodiment of the present invention, functions for performing predetermined processes are each enabled by filters comprising individual components so that customization and extension of a function may be easily realized. Specifically, functional dependency does not exist between the filters and independency of the filters is maintained so that a new function (application) may be easily developed by newly adding a filter or changing the connection of filters, for example. Thus, according to the present embodiment, when implementation of a new application is in demand and a part of the processes of this application is not currently implemented, the corresponding application may be implemented by merely developing and installing a filter for enabling the part of the processes that are not yet implemented. In this way, the need to make changes to the control layer 20 and the layers below the application logic layer 30 in accordance with the implementation of a new application may be reduced and a stable platform may be provided.

Accordingly, application development may not be substantially influenced by the granularity of the function or interface provided by the platform so that application development efficiency may be improved. Also, in the case of altering a part of a service provided by an application and implementing the altered application, only a part of the filter providing the service has to be altered and description of a new source code may not be necessary so that development efficiency may be improved.

Also, according to another aspect, in a process sequence of the image processing apparatus 100 for enabling the functions provided by the filters, the relevant processes are successively performed from the output filter 320 side. That is, the control layer 20 transmits an execution command for executing a function to the output filter 320 and controls this execution command to the transmitted from the output filter 320 toward the input filter.

According to such an arrangement, in a case where a process currently executed in the image processing apparatus 100 is to be interrupted or cancelled, the process may be interrupted or cancelled at an appropriate timing without risking the safety of the apparatus, for example.

Also, it is noted that in the present embodiment, the filters are configured to behave in the same manner upon receiving a command for executing a process. Specifically, the behavior (operations) of each filter involves performing a predetermined process and transmitting the execution command to a filter connected to the input side of the corresponding filter. This behavior corresponds to an operation definition of each filter, and each filter is controlled based on this operation definition. Specifically, the input filter 310, the processing filter 320, and the output filter 330 are controlled by the same operations definition in the present embodiment. With such an arrangement, the filters may operate in the same manner so that control of these filters may be facilitated.

In the following, a specific example of a process sequence performed in the image processing apparatus 100 is described.

Figure 4:
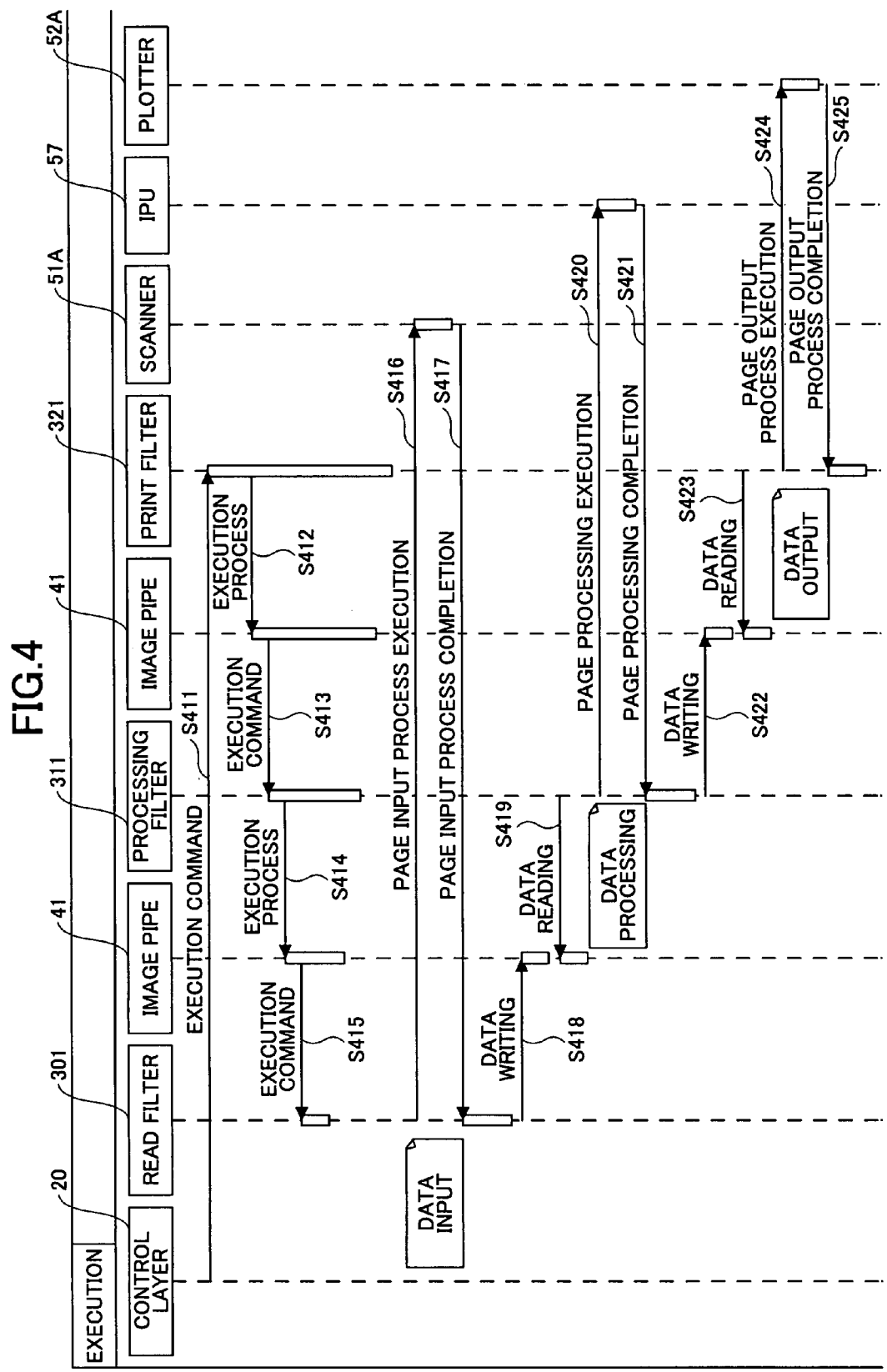
FIG. 4 is a diagram illustrating an exemplary process sequence for executing a process of a copying function.

FIG. 4 is a diagram illustrating a process sequence for executing processes of a copying function.

According to FIG. 4, when a copying function is selected via an operations panel (not shown) of the image processing apparatus 100, the user interface layer 10 accepts an execution command for executing the copying function. The execution command is then transmitted from the user interface layer 10 to the control layer 20, and then from the control layer 20 to the application logic layer 30.

More specifically, since an execution command is arranged to be transmitted from the control layer 20 to the output filter 320 in the image processing apparatus 100 according to the present embodiment, the execution command for executing the copying function is transmitted to the print filter 321 (step S411). Upon receiving this execution command, the print filter 321 transmits the execution command via the image pipe 41 to the document processing filter 311 that is connected to the input side of the print filter 321 (steps S412 and S413). Upon receiving the execution command, the document processing filter 311 transmits the execution command via the image pipe 41 to the read filter 301 that is connected to the input side of the document processing filter 311 (steps S414 and S415). In the present example, there is no predetermined process to be performed by the filters upon receiving an execution command as an execution process based on the operation definition of the filters so that each filter simply transmits the execution command to a filter connected to its input side.

Upon receiving the execution command, the read filter 301 outputs a read command to a scanner 51A directing the scanner 51A to read data subject to image processing and starts page input process operations for reading the data (step S416). In the present example, it is assumed that a paper document of one page is to be copied. When page input process operations for inputting data of this page are completed (step S417), the read filter 301 writes the input data to the image pipe 41 (step S418).

The document processing filter 311 detects when the data are written in the image pipe 41 and reads the written data from the image pipe 41 (step S419). Then, the document processing filter 311 performs image processing operations on the data at an image processing unit (IPU) 57 (step S420). It is noted that image processing operations performed in this process step may be an image integration process or an image scaling process, for example. When data processing is completed at the image processing unit (IPU) 57 (step S421), the processed data are written in the image pipe 41 (step S422).

The print filter 321 detects when the processed data are written in the image pipe 41 and reads the processed data from the image pipe 41 (step S423). Then, the print filter 321 executes data output processes at a plotter 52A (step S424). When the data output processes at the plotter 52A are completed, the copying function execution processes are ended (step S425).

It is noted that although the scanner 51A and the plotter 52A are not shown in FIG. 2, the scanner 51A corresponds to an input device (input unit) and the plotter 52A corresponds to an output device (output unit). The scanner 51A is controlled by the scanner control unit 51, and the plotter 52A is controlled by the plotter control unit 52.

Also, it is noted that although the processes executed within the filters are described as being successively executed in accordance with the data flow, the filters may start their corresponding processes at arbitrary timings irrelevant to the data flow after they receive the process execution commands. For example, the filters may wait until data are written in the pipes at their input sides and start their corresponding processes when the data are written in their corresponding input side pipes. In this case, since there is no input side pipe connected to the input filter 300, the input filter may start its corresponding process at the time it receives the process execution command, for example.

In the following, a specific example of interrupting a currently executed process in the image processing apparatus 100 is described.

In the image processing apparatus 100 according to the present embodiment, processes for interrupting a currently executed process are also successively performed from the output filter 320 side. That is, by successively interrupting processes from the output filter 320, the interruption processes may be controlled so that currently executed processes may be interrupted after desired data are output. In the following, an example is described in which a process of a copying function that is currently executed in the image processing apparatus is interrupted.

For example, in a case where an interruption command for interrupting a process of a copying function is issued within an image processing apparatus 100 that is currently performing the process of the copying function, if the processes executed within the filters are simultaneously interrupted at the time the interruption command is accepted, processing of a page may only be halfway through at this time so that the page may not be output and copying paper may remain within the image processing apparatus. Such a situation has potential risks of ignition, for example, so that safety of the image processing apparatus may not be adequately ensured.

To avoid such a situation, the interruption processes may be controlled such that in a case where processing of a page within the image processing apparatus is only halfway through at the time the interruption command is accepted, the process may be interrupted after the corresponding page is properly output, for example.

In another example, a fee may be charged for the usage of the copying function of the image processing apparatus 100. In this case, a predetermined fee may be charged each time a sheet of copy paper is output. When an interruption command for interrupting a currently executed process of the copying function is accepted at an image processing apparatus employing such a fee charging system, if the currently executed process is halfway through processing a page at the time the interruption command is accepted, the page that is halfway through with the currently executed process is preferably output to be subject to the fee charge and the process of the copying function is interrupted thereafter. Accordingly, in a preferred embodiment, a page that is halfway through with a process at the time an interruption command is accepted may be properly output at the output filter 320 and the processes of the other filters may be interrupted thereafter.

By performing the interruption processes in the above-described manner, the process of the copying function may be easily resumed in the image processing apparatus by starting the process with respect to a next page. That is, no particular recovery processes may be required for resuming the process of the copying function so that the process may be promptly resumed.

Also, in the image processing apparatus 100 according to the present embodiment, operations are performed based on the above-described operation definitions of the filters. Specifically, the operation of the filters including the output filter 320 are controlled such that upon receiving an interruption command, each filter executes a corresponding process on a set of data that is processed halfway at the time the interruption command is received and then transmits the interruption command to a filter connected to its input side. It is noted that in the present example, the predetermined process to be performed according to the operation definition corresponds to the process of outputting the set of data that is halfway through with the corresponding filter process at the time the interruption command is accepted.

Figure 5:
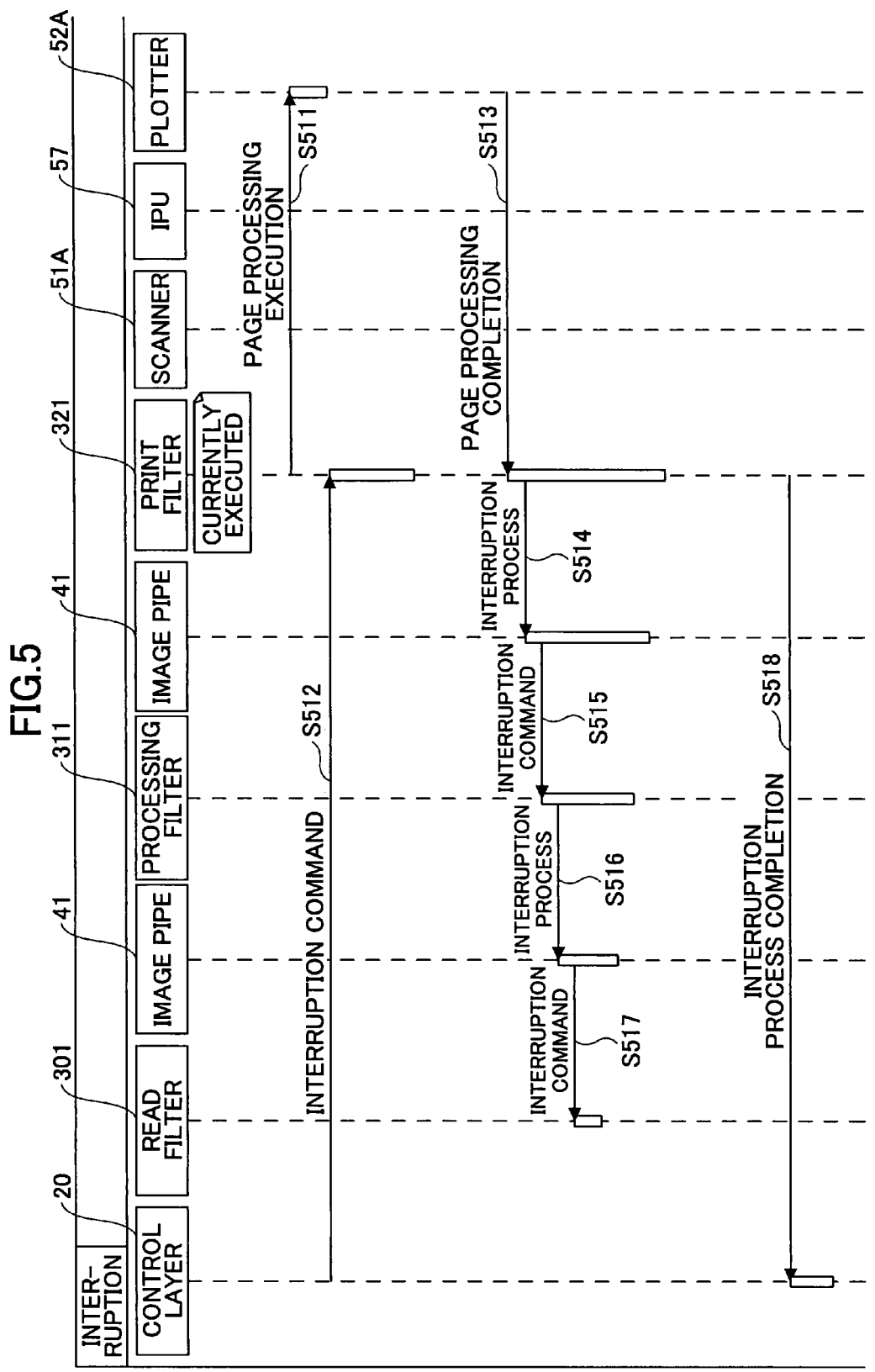
FIG. 5 is a diagram illustrating an exemplary process sequence for interrupting a process of a copying function.

In the following, an example of interrupting the process of a copying function in the image processing apparatus 100 is described with reference to FIG. 5. FIG. 5 is a diagram illustrating a process sequence for interrupting the process of a copying function.

According to the example of FIG. 5, the user interface layer 10 accepts an interruption command for interrupting a printing process when a printing process is performed at the plotter 52A by the print filter 321 (step S511). The interruption command accepted at the user interface layer 10 is transmitted to the control layer 20, and the control layer 20 outputs a process interruption command to the print filter 321 based on the interruption command from the user interface layer 10 (step S512). Upon receiving this process interruption command, the print filter 321 starts interruption process operations for interrupting the printing process operations of the plotter 52A.

In interrupting the printing process, the print filter 321 outputs data up to a predetermined data set and then interrupts the printing process. The predetermined data set refers to the data set that is processed halfway through at the time the interruption command is accepted. In a specific example, when the printing process subject to the interruption process corresponds to a dual side printing process and only printing of one side is completed at the time the interruption command is accepted, the predetermined data set may be print data up to page data to be printed on the other side, and the printing process may be interrupted after the page data are printed on the other side. In another example, when the printing process subject to the interruption process corresponds to a single side printing process, the predetermined data set may be data up to the page data that is currently being printed. It is noted that the predetermined data set up to which the printing process is to continue from the time an interruption command is accepted may be set beforehand in the image processing apparatus 100, for example.

After the print filter 321 prints and outputs data up to a predetermined data set using the plotter 52A, it interrupts the printing process (step S513). Then, the print filter 321 informs the image pipe 41 that the printing process within the print filter 321 has ended (step S514). Upon receiving the interruption command from the image pipe 41, the document processing filter 311 completes processing of a predetermined data set and then interrupts the data processing (S515). Specifically, the document processing filter 311 completes data processing of a data set that is processed halfway through at the time the interruption command is received from the image pipe 41 and starts interruption process operations for ending the data processing operations after data processing of the corresponding data set is completed. After interrupting the data processing operations, the document processing filter 311 transmits the interruption command to the read filter 301 via the image pipe 41 (step S516).

Upon receiving the interruption command from the image pipe 41, the read filter 301 starts interruption process operations for interrupting a read process performed by the scanner 51A. In interrupting the read process, the read filter 301 executes the read process on data up to a predetermined data set and then interrupts the read process (step S517). Specifically, the read filter 301 executes the read process on the data set that is read halfway through at the time the interruption command is received from the image pipe 41, and starts interruption process operations after the read process operations on the data set are completed. After the interruption process of the read filter 301 is ended, the interruption process of the image processing apparatus 100 is completed (step S518), and the image processing apparatus 100 changes its status to interrupted status.

It is noted that when processes are completed on all pages subject to the copying process at the time the image processing apparatus 100 changes its status to interrupted status, the output device of the image processing apparatus 100 may be released, and the image processing apparatus 100 may move onto process completion status, for example.

In the following, a process sequence for terminating a currently executed process of the copying function (i.e., cancelling process) in the image processing apparatus 100 is described.

In the process sequence for cancelling a process executed at the image processing apparatus 100, first, operations of the plotter 52A are terminated at the time a cancel command is received. In this way, a printing process may be promptly terminated upon receiving a cancel command at the image processing apparatus 100.

For example, in an image processing apparatus that employs a fee charging system as is described above in which a fee is charged every time a copy sheet is output, if data of a page that is processed halfway are output after a cancel command is received, a fee may be charged for this page as well which is not desirable for the user. Thus, in the image processing apparatus 100 according to the present embodiment, when a cancel command is received, operations of the plotter 52A are stopped before data of the page processed halfway are output. Also, it is noted that the image processing apparatus 100 operates based on the above-described operation definitions of the filters. Specifically, in the image processing apparatus 100 according to the present embodiment, operations of each of the filters including the output filter 320 are controlled such that upon receiving a cancel command, a corresponding filter performs a cancelling process for cancelling the process being executed by the corresponding filter and transmits the cancel command to a filter connected to the input side of this filter after completing the cancelling process. In this case, the predetermined process defined by the operation process corresponds to the cancelling process performed by the corresponding filter upon receiving a cancel command.

Figure 6:
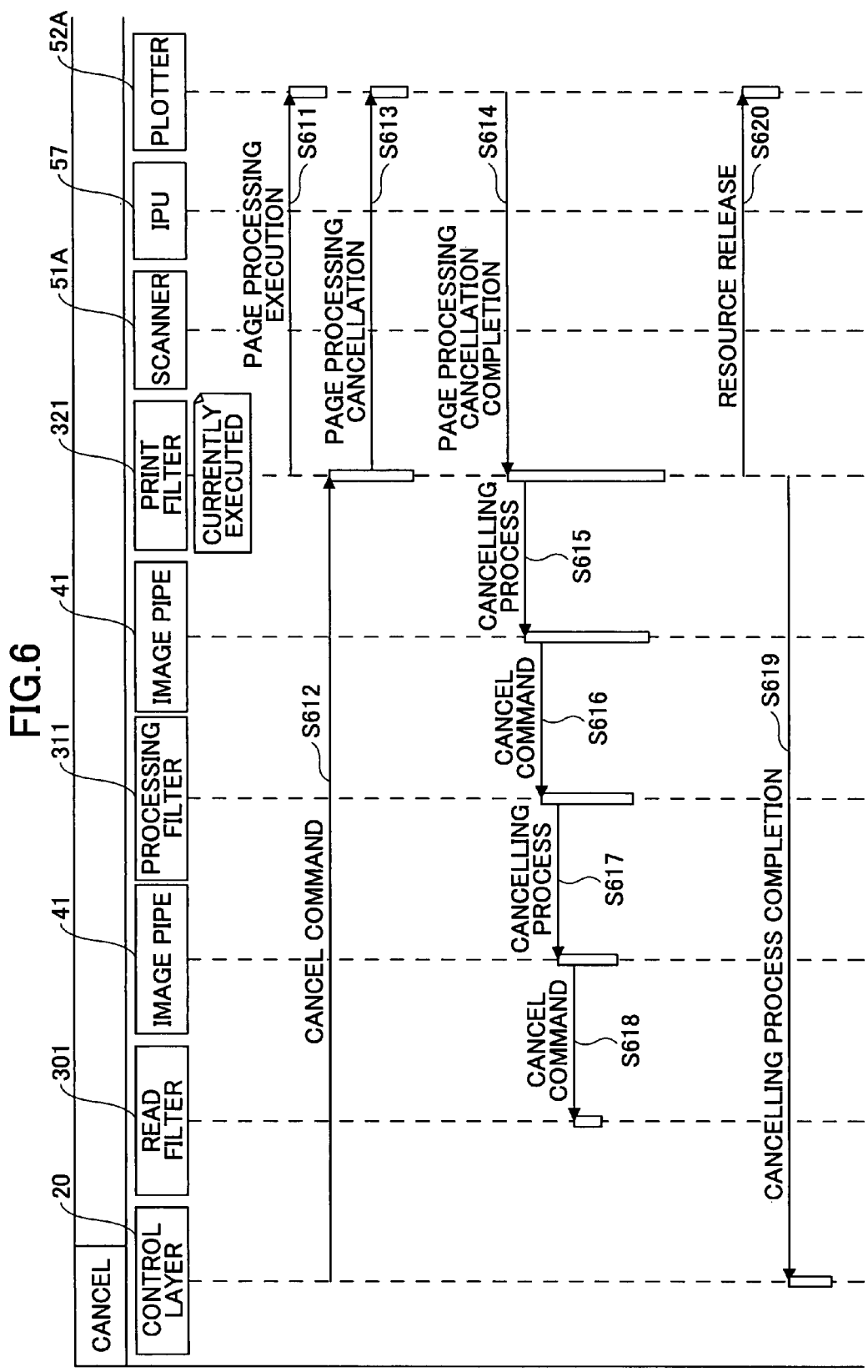
FIG. 6 is a diagram illustrating an exemplary process sequence for cancelling a process of a copying function.

FIG. 6 is a diagram illustrating an exemplary process sequence for cancelling a process of the copying function in the image processing apparatus 100 according to the present embodiment.

According to the example of FIG. 6, a cancel command is accepted by the user interface layer 10 when the print filter 321 is executing a printing process using the plotter 52A (step S611). Upon receiving the cancel command, the user interface layer 10 transmits the cancel command to the control layer 20. In turn, the control layer 20 outputs a printing process cancel command to the print filter 321 based on the cancel command received from the user interface layer 10 (step S612). Upon receiving the printing process cancel command from the control layer 20, first, the print filter 321 stops operations of the plotter 52A (step S613). After stopping operations of the plotter 52A, the print filter 321 completes the cancelling process by performing a recovery process for enabling execution of a next process, for example.

After completing the cancelling process, the print filter 321 transmits the cancel command to the image pipe 41 (step S614). In turn, the image pipe 41 transmits the cancel command to the document processing filter (step S615). It is noted that when the cancelling process cannot be executed before the page data processed halfway through are output, the print filter 321 may transmit the cancel command to the image pipe 41 after the page data processed halfway through are output.

In one embodiment, the image processing apparatus may be configured to discharge copying paper remaining within the apparatus after the cancelling process is completed. In another embodiment, when a cancel command is received halfway through a dual printing process and printing is only completed on one side at this time, for example, the printing process for printing the other side may be cancelled and the printed paper may be discharged.

Upon receiving the cancel command from image pipe 41, the document processing filter 311 cancels its data processing operations (step S616). After cancelling its data processing operations, the document processing filter 311 transmits the cancel command to the image pipe 41 (step S617).

Upon receiving the cancel command from the image pipe 41, the read filter 301 cancels its read process (step S618). Specifically, the read filter 301 stops operations of the scanner 51A upon receiving the cancel command, and in a case where unscanned documents remain within the scanner 51A, such documents may be discharged, for example. After the cancelling process of the read filter 301 is completed, the cancelling process of the image processing apparatus is ended (step S619), and the plotter 52A corresponding to an output device of the image processing apparatus 100 is released.

By performing the cancelling process as is described above, the image processing apparatus 100 may promptly terminate a data outputting process at a suitable timing, for example.

As can be appreciated from the above descriptions, in the image processing apparatus 100 according to an embodiment of the present invention, operations performed in the above-described process sequences are controlled based on operations of the output filter 320. Accordingly, currently executed processes may be properly interrupted or cancelled in interruption processes or cancelling processes without having to change the filter control system. Also, since operations of the filters of the image processing apparatus 100 are controlled based on the same operation definition, filter control at the control layer 20 may be facilitated and a new filter may be easily generated, for example.

In the following, a computer-readable medium that stores an image processing program for enabling a computer to execute the above described functions of the image processing apparatus 100 is described with reference to FIG. 7.

Figure 7:
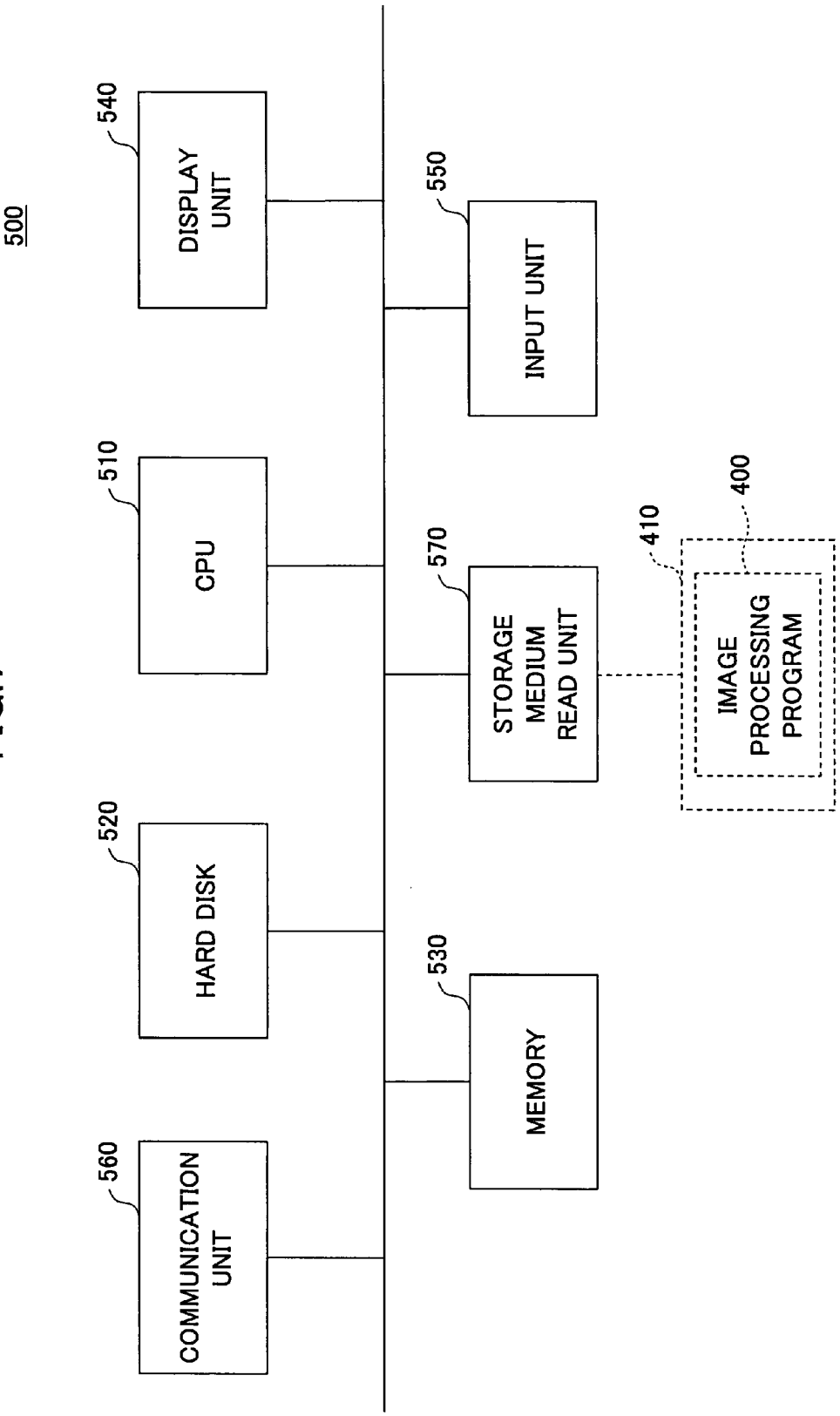
FIG. 7 is a block diagram showing a configuration of a computer that reads and executes an image processing program according to an embodiment of the present invention.

FIG. 7 is a block diagram showing a configuration of a computer 500 that is configured to read and execute an image processing program 400 according to an embodiment of the present invention that is stored in a computer-readable medium 410.

The computer 500 includes a CPU 510, a hard disk 520, a memory 530, a display unit 540, an input unit 550, a communication unit 560, and a storage medium read unit 570, for example. The CPU 510 is a processor that executes computations and processes to be performed within the computer 500. The hard disk 520 is a storage unit that stores data such as applications that operate on computer 500 and data generated by these applications. The memory 530 may store various setting values associated with the computer 500 and computation results obtained by the CPU 510, for example.

The display unit 540 may present data generated within the computer 500 to a user in a visible format. The input unit 550 may be a keyboard or a mouse for inputting data through user operations, for example. The communication unit 560 may be a network control unit for enabling the computer 500 to establish communication with an external apparatus, for example. The storage medium read unit 570 is for reading data and/or programs stored in a storage medium. For example, the storage medium read unit 570 may be a floppy (registered trademark) disk driver.

In one embodiment, the storage medium 410 may store the image processing program 400 according to the present embodiment. In this case, the image processing program 400 may be read by the storage medium read unit 570 and executed by the CPU 510. It is noted that the storage medium 410 may be a removable computer-readable storage medium such as a floppy (registered trademark) disk or a CD-ROM, for example. In another embodiment, the image processing program 400 may be transmitted to the communication unit 560 via a network to be stored in the hard disk 520, for example.

Although the present invention is shown and described with respect to certain preferred embodiments, it is obvious that equivalents and modifications may occur to others skilled in the art upon reading and understanding the specification. The present invention includes all such equivalents and modifications, and is limited only by the scope of the claims.

The present application is based on and claims the benefit of the earlier filing date of Japanese Patent Application No. 2006-240751 filed on Sep. 5, 2006, the entire contents of which are hereby incorporated by reference.

What is claimed is:

1. An image processing apparatus comprising:
   an input unit that inputs data subject to image processing;
   an input filter that controls data input operations of the input unit;
   an output unit that outputs processed data resulting from the image processing;
   an output filter that controls data output operations of the output unit; and
   at least one processing filter arranged between the input filter and the output filter which processing filter processes the input data;
   wherein at least one of an interruption process and a termination process for stopping the image processing is successively performed within the output filter, the processing filter, and the input filter starting with the output filter.

2. The image processing apparatus as claimed in claim 1, wherein
   the input filter, the output filter, and the processing filter are controlled based on a common operation definition.

3. The image processing apparatus as claimed in claim 1, wherein
   the output filter, the processing filter, and the input filter successively perform the interruption process by completing predetermined data processing upon receiving an interruption command and outputting the interruption command after completing the predetermined data processing.

4. The image processing apparatus as claimed in claim 1, further comprising
   a control unit that controls the input filter, the output filter and the processing filter; wherein
   when the control unit issues an image processing execution command to the output filter, predetermined processes are independently performed by the input filter, the output filter, and the processing filter.

5. An image processing method performed by an image processing apparatus, the image processing method comprising:
   a step of controlling input operations of an input unit that inputs data subject to image processing;
   a step of controlling output operations of an output unit that outputs processed data resulting from the image processing; and
   a step of processing the data which step is performed between the input operations controlling step and the output operations controlling step; wherein
   at least one of an interruption process and a termination process for stopping the image processing is successively performed, by the image processing apparatus, with respect to each of the output operations controlling step, the data processing step, and the input operations controlling step, starting with the output operations controlling step.

6. A computer-readable image processing program which is embodied in a non-transitory computer-readable medium and, when executed by a computer, causes the computer to perform:
   a step of controlling input operations of an input unit that inputs data subject to image processing;
   a step of controlling output operations of an output unit that outputs processed data resulting from the image processing; and
   a step of processing the input data which step is performed between the input operations controlling step and the output operations controlling step; wherein
   at least one of an interruption process and a termination process for stopping the image processing is successively performed with respect to each of the output operations controlling step, the data processing step, and the input operations controlling step, starting with the output operations controlling step.

* * * * *